(12) United States Patent
Müller

(10) Patent No.: US 7,530,593 B2
(45) Date of Patent: May 12, 2009

(54) AIRBAG DEVICE AND OPERATING METHOD FOR SAID DEVICE

(75) Inventor: Olaf Müller, Rüsselsheim (DE)

(73) Assignee: Inova GmbH, Russelsheim (DE)

( * ) Notice: Subject to any disclaimer, the term of this patent is extended or adjusted under 35 U.S.C. 154(b) by 0 days.

(21) Appl. No.: 11/376,614

(22) Filed: Mar. 15, 2006

(65) Prior Publication Data

US 2007/0108743 A1    May 17, 2007

Related U.S. Application Data

(63) Continuation-in-part of application No. PCT/DE2004/002076, filed on Sep. 16, 2004.

(30) Foreign Application Priority Data

Sep. 16, 2003 (DE) ................. 203 14 374
Dec. 4, 2003 (DE) ................. 203 18 815
Mar. 5, 2004 (DE) ............ 20 2004 003 470 U

(51) Int. Cl.
*B60R 21/16* (2006.01)

(52) U.S. Cl. .................. 280/729; 280/731; 280/740; 280/742; 280/743.1

(58) Field of Classification Search ............... 280/729, 280/743.1, 731, 740, 742
See application file for complete search history.

(56) References Cited

U.S. PATENT DOCUMENTS

| 3,580,603 | A | 5/1971 | Chute |
| 5,899,488 | A | 5/1999 | Müller |
| 6,523,854 | B1 | 2/2003 | Muller |
| 6,527,295 | B2 | 3/2003 | Müller |
| 6,685,216 | B2 | 2/2004 | Müller |
| 6,733,033 | B2 | 5/2004 | Müller |
| 6,913,283 | B2 * | 7/2005 | Heym .................. 280/732 |
| 2001/0028162 | A1 * | 10/2001 | Takimoto et al. ........... 280/731 |
| 2001/0033072 | A1 | 10/2001 | Kumagai et al. |
| 2003/0173762 | A1 | 9/2003 | Kamagai et al. |

FOREIGN PATENT DOCUMENTS

| DE | 1935426 A1 | 1/1970 |
| DE | 2625184 A | 8/1977 |
| DE | 19726878 | 8/1998 |
| DE | 19733896 | 2/1999 |
| DE | 10025417 | 11/2000 |
| DE | 10013759 | 1/2001 |
| DE | 10123685 | 1/2002 |
| EP | 00112432.0 | 4/1983 |
| EP | 00125150.3 | 5/1984 |
| EP | 0867346 | 9/1998 |

(Continued)

*Primary Examiner*—Eric Culbreth
(74) *Attorney, Agent, or Firm*—Martin Fleit; Paul Bianco; Fleit Gibbons Gutman Bongini & Bianco PL

(57) ABSTRACT

The invention creates an airbag device, wherein a driver's airbag is provided, at least substantially "stationary" relative to a steering wheel movement, and which has a shape that at least partially covers an adjacent A column of a vehicle in the inflated state or has a butterfly-like shape, which is correctly correlated with the driver by the embodiment of the driver's airbag stationary in any steering wheel position. Furthermore, the invention creates an operating method for such an airbag device.

9 Claims, 7 Drawing Sheets

FOREIGN PATENT DOCUMENTS

| | | | |
|---|---|---|---|
| EP | 1059210 | | 12/2000 |
| EP | 1101665 | | 5/2001 |
| EP | 1278661 | | 8/2004 |
| EP | 1274611 | | 9/2004 |
| ES | 369315 | A1 | 6/1971 |
| FR | 2013229 | | 3/1970 |
| GB | 1209567 | A | 10/1970 |
| GB | 2265118 | * | 9/1993 |
| JP | 2001-233157 | A | 8/2001 |
| WO | WO 93/16902 | * | 9/1993 |
| WO | WO 99/61288 | | 12/1999 |
| WO | PCT/DE 00/02391 | | 2/2001 |
| WO | PCT/DE 00/02625 | | 2/2001 |
| WO | WO 01/07297 | | 2/2001 |
| WO | WO 01/10684 | | 2/2001 |
| WO | WO 01/14172 | | 3/2001 |

* cited by examiner

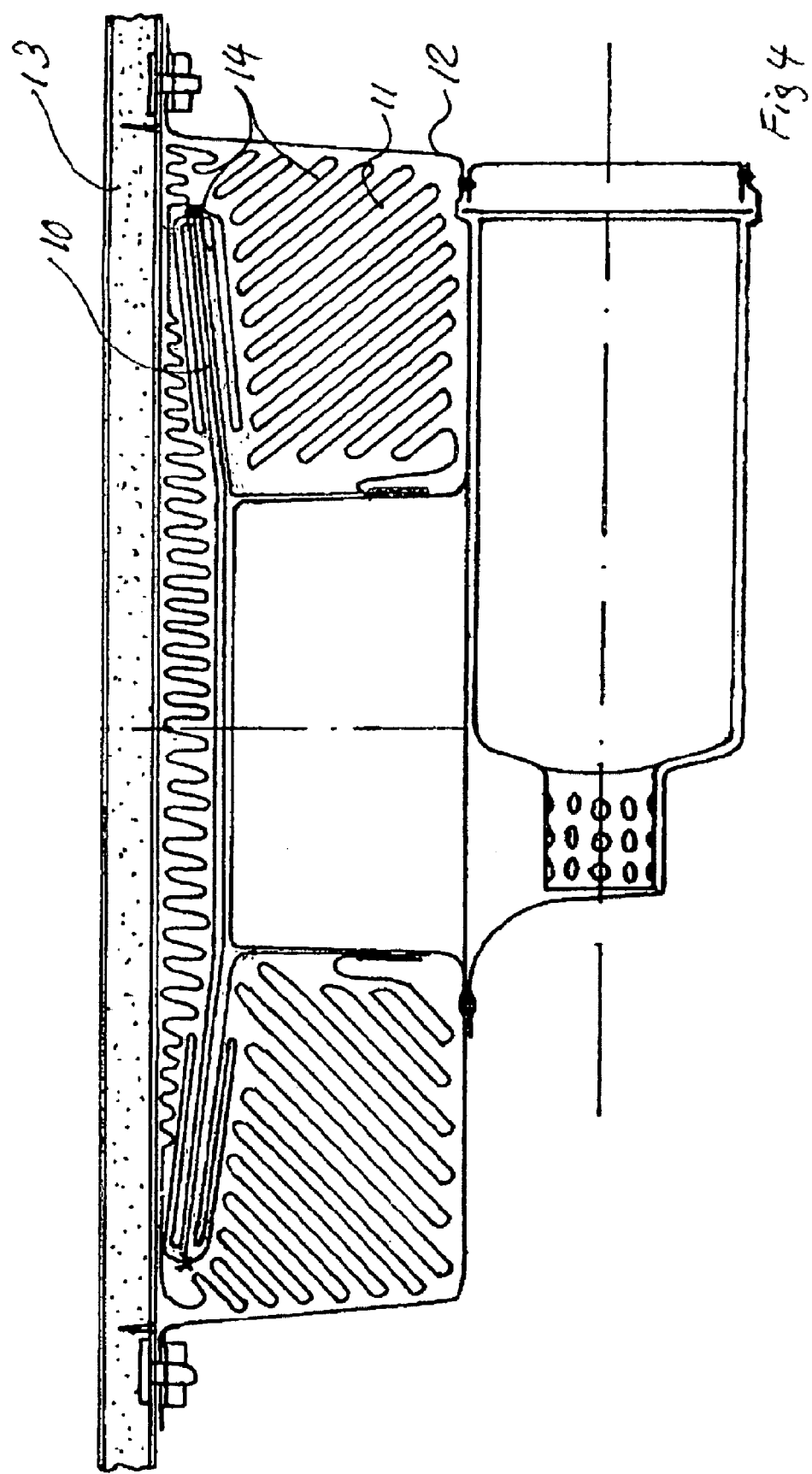

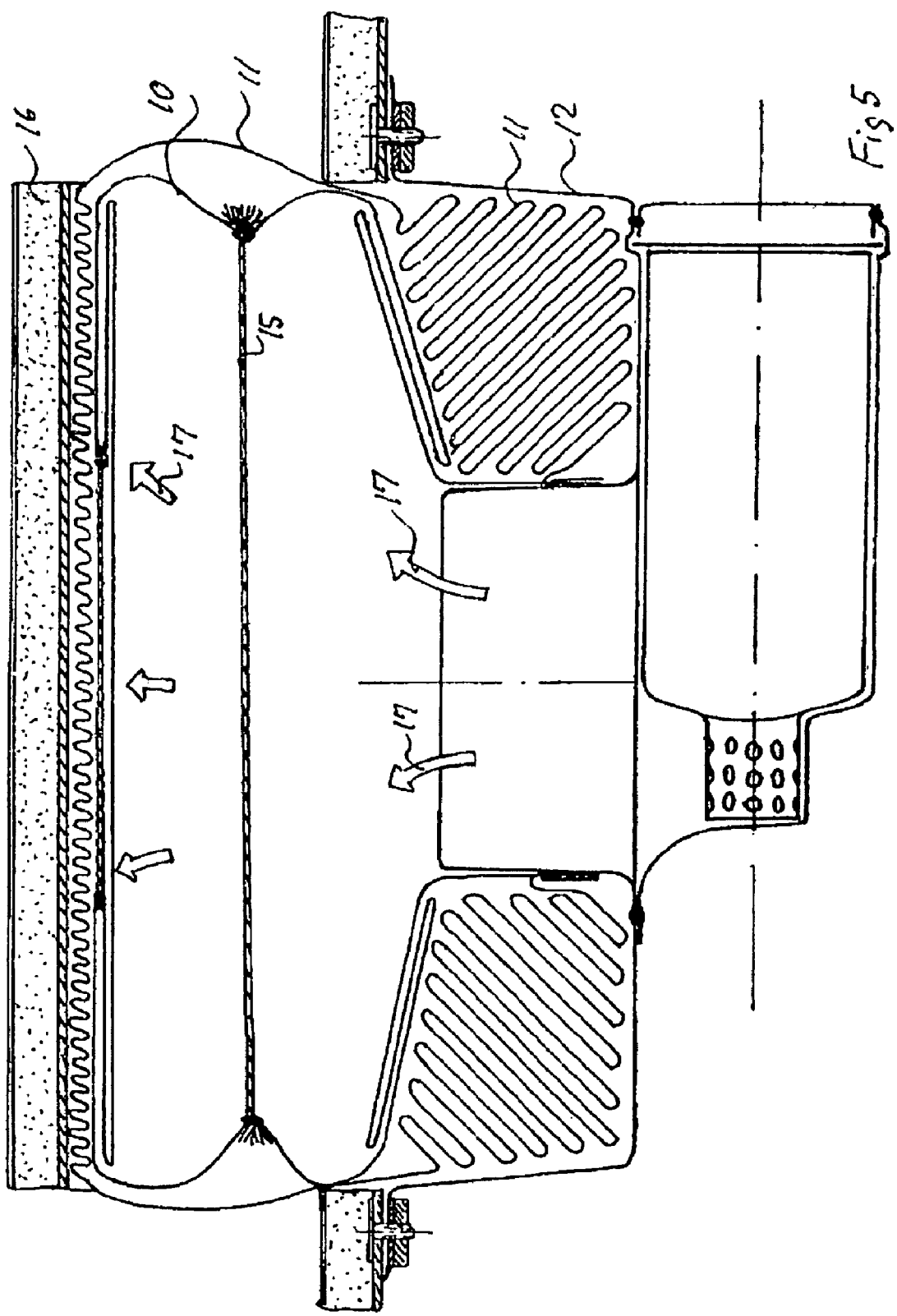

AIRBAG DEVICE AND OPERATING METHOD FOR SAID DEVICE

FIELD OF THE INVENTION

The invention generally concerns an airbag device as well as an operating method for it.

BACKGROUND OF THE INVENTION

The older German Patent Application Nos. 197 12 782.7, 197 26 878.1, 197 33 896.8, 100 13759.8, 100 25 417.9, and 101 23 685.9; European Patent Application Nos. 98 10 55 51.0, 99 93 63 35.1, 00 11 24 32.0, and 00 12 51 50.3; International Patent Application Nos. PCT/DE 99/01564, PCT/DE 00/02625, PCT/DE 00/02892, PCT/DE 00/02391, PCT/DE 01/01379, PCT/DE 01/01594; and Utility Model Application Nos. 298 09 554.8, 298 19 165.2, 298 20 722.2, 299 05 000.9, 299 05 919.7, 299 08 946.0, 299 10 059.6, 299 13 628.0, 200 11 391.7, 200 12 707.1, 200 16 554.2, 201 01 990.6, and 201 09 976.4, which trace back to the applicant/holder under consideration, generally deal with an airbag device and production and triggering methods for it, in particular, in connection with airbag flaps to be opened actively and their controls. The complete disclosure contents from the earlier applications, in particular with regard to airbag flaps to be opened actively and their controls, are incorporated, in their complete scope by reference in the documents under consideration, thus avoiding mere repetition.

The PCT application PCT/DE 02/04097 (WO 03/047917) deals in particular with the technologies of driver airbags that do not also rotate. To avoid mere repetitions, the complete disclosure contents of this publication, with regard to the aforementioned technology, are hereby also incorporated, in their full scope, by reference in the documents under consideration.

Rotation of the steering wheel nowadays makes it is necessary to form the airbag round, since its effect should be the same in any steering wheel position.

The invention under consideration has as its objective further improvements over the current state of the art, and in particular, increased safety for drivers of motor vehicles.

The invention under consideration concerns and creates, to this end, a "stationary" contour airbag, in particular with active transverse unfolding, and a corresponding operating method. In addition, however, other aspects worthy of protection and patentable in and of themselves are disclosed in the documents under consideration—in particular, also concerning airbag protection for a front-seat passenger, wherein these other aspects can also be combined with versions of the stationary contour driver airbag with active transverse unfolding for a further increase in overall safety.

SUMMARY OF THE INVENTION

Thus, an airbag device with an airbag in accordance with the invention is characterized in that the airbag is designed so that it is initially spread in an ejection direction at least substantially transverse to the protection propagation direction towards the occupant.

As a preferred configuration of this, an auxiliary airbag within the airbag can be provided for spreading the airbag in the ejection direction. It is also possible to provide, in particular, for the auxiliary bag to be closed before a triggering takes place.

Another preferred configuration is found in the fact that the airbag device is designed to develop a high pressure of up to 60 bar for spreading the auxiliary bag.

Furthermore, provision is preferably made so that the auxiliary bag has ends, and in addition, is designed so that its ends open when a prespecified gas pressure is exceeded and gas flows from it into the air bag.

Furthermore, in particular, the auxiliary bag can have a shape similar to a starfish in its inflated state. Preferably, provision can also be made so that the airbag device is designed to be used with a steering wheel, on the driver's side of the motor vehicle, wherein the auxiliary bag in its inflated state is shaped like a starfish at least approximately the size of an associated steering wheel.

Furthermore, it is preferred, within the scope of the invention, that the airbag device be designed so that it is used on the front-seat passenger side of a motor vehicle, wherein the auxiliary bag has a hose-like shape in the inflated state, which is shown schematically in FIG. 8, is folded-in before being triggered, and when triggered is spread out in the ejection direction, at least substantially, transverse to the direction of travel of the motor vehicle. An advantageous configuration of this is that the auxiliary bag is shaped and designed so as to unfold further into a form similar to that of a dog bone, which is shown schematically in FIG. 9, at the final stage of its spreading at the end of the hose-like shape.

It is even more preferred that the airbag device be designed to create a large surface area for application of force in the protection propagation directly by spreading of the airbag, in the first instance, at least substantially, in the ejection direction.

Surprisingly, it has been shown that it is particularly advantageous for the airbag to have a butterfly-wing-like shape, and thus also, for the hard "A" column in particular to be covered with a corresponding airbag "crosspiece." This can be achieved, in accordance with the invention, in particular in that a correspondingly contoured airbag is blown out "transversely actively."

In accordance with a preferred refinement, a folded-in, sewed-shut auxiliary airbag allows the cover to burst first upon ignition, and then, with its sewed-shut arms, draws the contoured actual airbag into the prespecified starting form before the auxiliary airbag bursts at the "fingertips" and releases the gas into the actual airbag in the transverse direction. Alternatively, the breaking-up of the cover and the unfolding of the airbag can be optimized by a "reciprocating piston."

In an advantageous manner, activation of a driver's airbag with an advantageously optimal asymmetrical contour for a better protective effect, and in particular, unfolding at a right-angle to the occupant takes place in all directions to reduce the aggressiveness of its action.

Furthermore, within the scope of the invention, an installation of an auxiliary airbag, sewn in the shape of a starfish, which first raises the airbag cover is preferably provided; it is then allowed to burst and draws out the specifically shaped, protecting airbag "transversely."

The invention also creates airbag devices with an airbag having unfolding control devices, particularly for active transverse unfolding, and an operating method for it. The direction of transverse unfolding is thereby transverse with reference to the spreading direction of an airbag toward an occupant. Thus, the aggressiveness of the airbag deployment is reduced in a simple, reliable, and low-cost method, so as to avert risks of injury to occupants by opening airbags.

In accordance with the invention, devices and methods, preferably including an optimized folding of the gas bag, are used for a purposeful blowing-out of the gas via unfolding control devices, in particular in the transverse direction so as to create in this way a larger airbag basis during the blowing-out of the gas bag or airbag, by means of which, so-to-speak, the aggressiveness of the spreading airbag is distributed; and/or are used in order to provide and/or to open the exit path of an airbag from its accommodation behind a vehicle interior lining.

Since the gas has a low specific weight, if it is inflated at a maximum rate of 280 km/h, in accordance with this other advantageous specification, an enlargement of the bag by 10% advantageously results according to the law $m/2 \times v^2$.

The invention under consideration uses the pressure of the gas to enlarge the airbag, in accordance with other preferred configurations. In particular, a 500-fold force can be obtained by the law "pressure X area" for a directed unfolding of the airbag with flanking techniques.

In order to allow the pressure to develop, it is preferred that gas first be "captured" in hoses, tubes, or small auxiliary bags, which are packed in the actual bag and later tear.

Since these auxiliary means (hoses, tubes, or small auxiliary bags, which are packed in the actual bag and later tear) produce a great force in a short path, they are also advantageously useful for the restricted opening of the covers, for example, with the driver's bag, in accordance with other configurations.

According to the invention under consideration, a tangential airbag gas inflow conduit for different airbag models and an operating method for it are in particular created in accordance with other preferred configurations.

For the improvement of the airbag device, the invention provides for an increase in the airbag surface area at the time of the forward propagation of the airbag, relative to an occupant. The airbag surface area is spread tangentially from the outside edge of the airbag outwardly into the plane or into the space, and lies as close as possible to the occupant. In addition, the invention shows alternative solutions for different airbag systems or airbag devices.

Other preferred and/or advantageous configurations of the invention are deduced from the subordinate claims and their combinations and all of the available application documents.

BRIEF DESCRIPTION OF THE DRAWINGS

The invention is explained in more detail with the aid of the following embodiments with reference to the drawings, in which:

FIG. 4, another embodiment for an airbag;

FIG. 5, a detail of the embodiment according to FIG. 4;

DETAILED DESCRIPTION OF THE INVENTION

Figure 1:
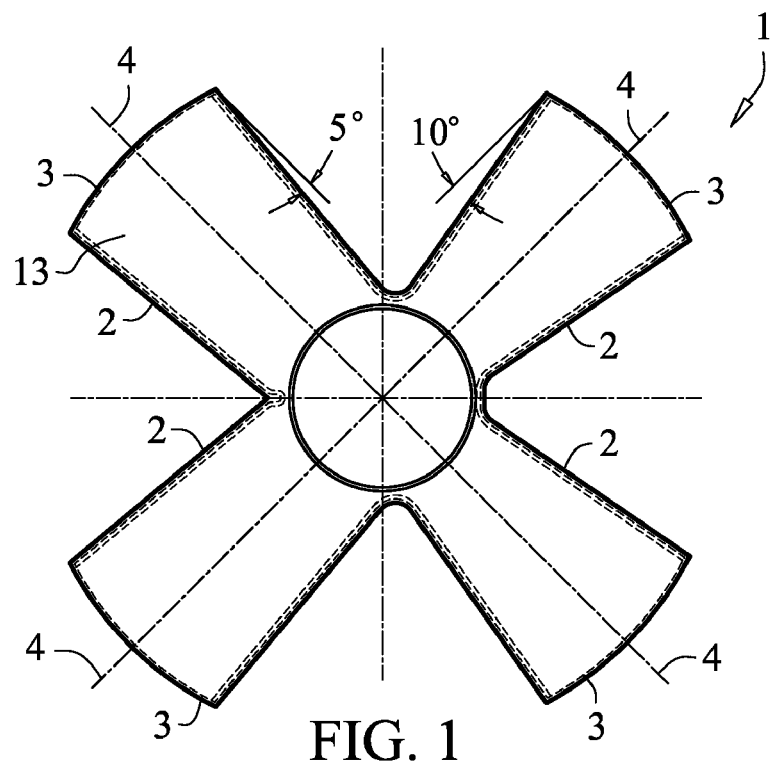
FIG. 1 shows schematically an embodiment of an auxiliary bag of the airbag device in accordance with the invention.

The invention is explained in more detail by way of example only with the aid of embodiment and application examples, described below and shown in the drawings.

The same reference symbols in the respective figures and depictions of the drawings designate the same or similar components, or components that act in the same or a similar manner. Features not provided with reference symbols are also clear with the aid of the representations in the drawing independently of whether or not those features are described below. On the other hand, features contained in the description under consideration but not visible or represented in the drawing are also readily understandable to a specialist.

Individual features that are indicated and/or are represented in connection with concrete embodiments are not limited to these embodiments or the combination with the other features of these embodiments, but rather can be combined, within the scope of what is technically possible, with any other variants, even if they are not treated separately in the documents under consideration.

The unfolding control devices in accordance with the invention provide, in their respective configurations, for the unfolding of the airbag before its actual inflation, in particular in the transverse direction relative to its spreading or protective direction. The unfolding control devices are defined by their function and the individual components can be deduced readily by a specialist from the description and/or the representations in the drawings. When an airbag module is being discussed below, then this generally also stands, without limitations, for an airbag device that is not constructed modularly.

FIG. 1 shows the top view of a sewn auxiliary bag 1, which is advantageously used in a such a way that it brings a butterfly wing-like airbag 2 into its "starting position." Simply sewn front-end seams 3 then burst and release the gas 4 into the airbag 2 at the border of an area that is almost the size of the steering wheel.

Figure 2:
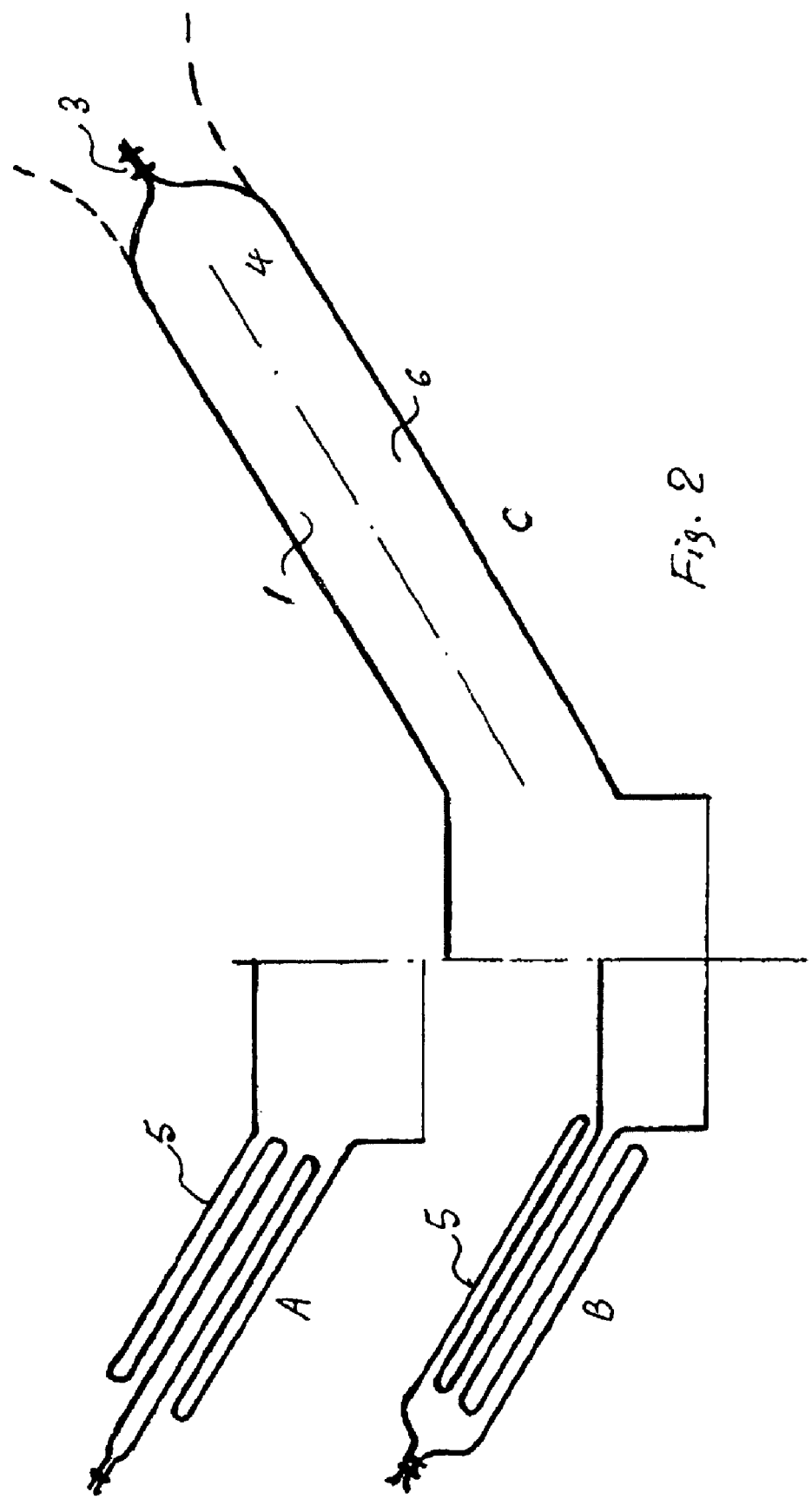
FIG. 2 shows schematically two folding variants of an auxiliary bag of the airbag device in accordance with the invention.

FIG. 2 schematically shows a folding 5 of the auxiliary bag 1 in the alternatives A and B. The gas 4 must be able to flow, unhindered, to the front-end seam 3. A simple "plugging up" of the auxiliary bag 2 leads to the lateral bursting of the fingers 6. The model C schematically shows the inflated "fingers" 6.

Figure 3:
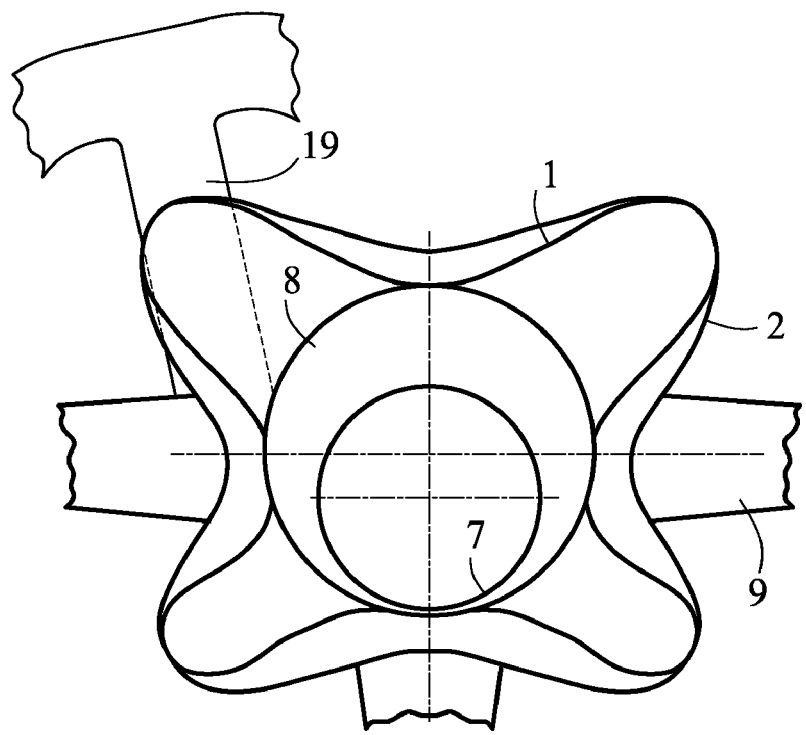
FIG. 3 shows an embodiment of a driver's airbag with an integrated auxiliary bag.

FIG. 3 shows the driver's airbag 2 with an integrated auxiliary bag 1, which produces a butterfly-like shape, above all, directed to cover the A column, schematically shown at 19. In this configuration and shaping, provision is made so that, for the most part, the driver's airbag 2 does not rotate, but rather remains essentially in a stationary, prespecified rotational position.

As is provided in connection with the variant in accordance with FIG. 3, a configuration variant to this is that the generator 7 lies below, eccentrically, in the airbag housing. The entire airbag module 8 is supported so that it cannot rotate (not depicted) with the driver's bag 2 due to gravity, always remaining in position, and in particular in its prespecified rotational position with respect to the vehicle. The airbag is preferably locked, for example, by means of bolts or a toothed construction, against unintended rotation from the pressure during the explosion, as is technically readily implementable and therefore not explained here separately. For ease of comprehension, steering wheel 9 is drawn only in part.

Another alternative is to fix the driver's airbag 2 on a shaft that is torsion-proof and angularly flexible. This shaft leads through a hollow steering column shaft and articulation with a centric hole. The shaft is fixed to the steering gear or its surroundings. This embodiment is simple to understand and is therefore not illustrated.

Another alternative is a front-seat passenger's bag with active transverse unfolding, which, as is standard today, must open its flap automatically.

In this respect, it is necessary to allow the airbag exit point, just as is standard today, to emerge, "top-mounted" on the surface of the dashboard such that a head (OOP=out of position) cannot come to lie on the airbag flap. The airbag exit point must for that purpose be placed correspondingly close to the windshield.

The advantage: lower costs, when compared to the systems with a retractable flap (active door). The disadvantage is less reduction of the aggressiveness with OOP.

In this respect, in the embodiment under consideration, according to FIG. 4, the auxiliary airbag 10 is folded into the actual airbag 11 (see FIG. 4). The module housing 12 is advantageously attached all around the dashboard 13. The folding 14 of the bags 10 and 11 is designed for optimal unfolding, as is shown in FIG. 4.

FIG. 5 shows, in particular, details of this embodiment. During opening of the airbag cover 16, the auxiliary airbag 10 is hindered with ropes/threads 15 etc., from unfolding in the transverse direction until the airbag cover 16 is completely opened. The first gas pressure stage and the ropes/threads 15 to be torn are appropriately coordinated.

In alternative embodiments, the ropes/threads 15 can be omitted.

Figure 6:
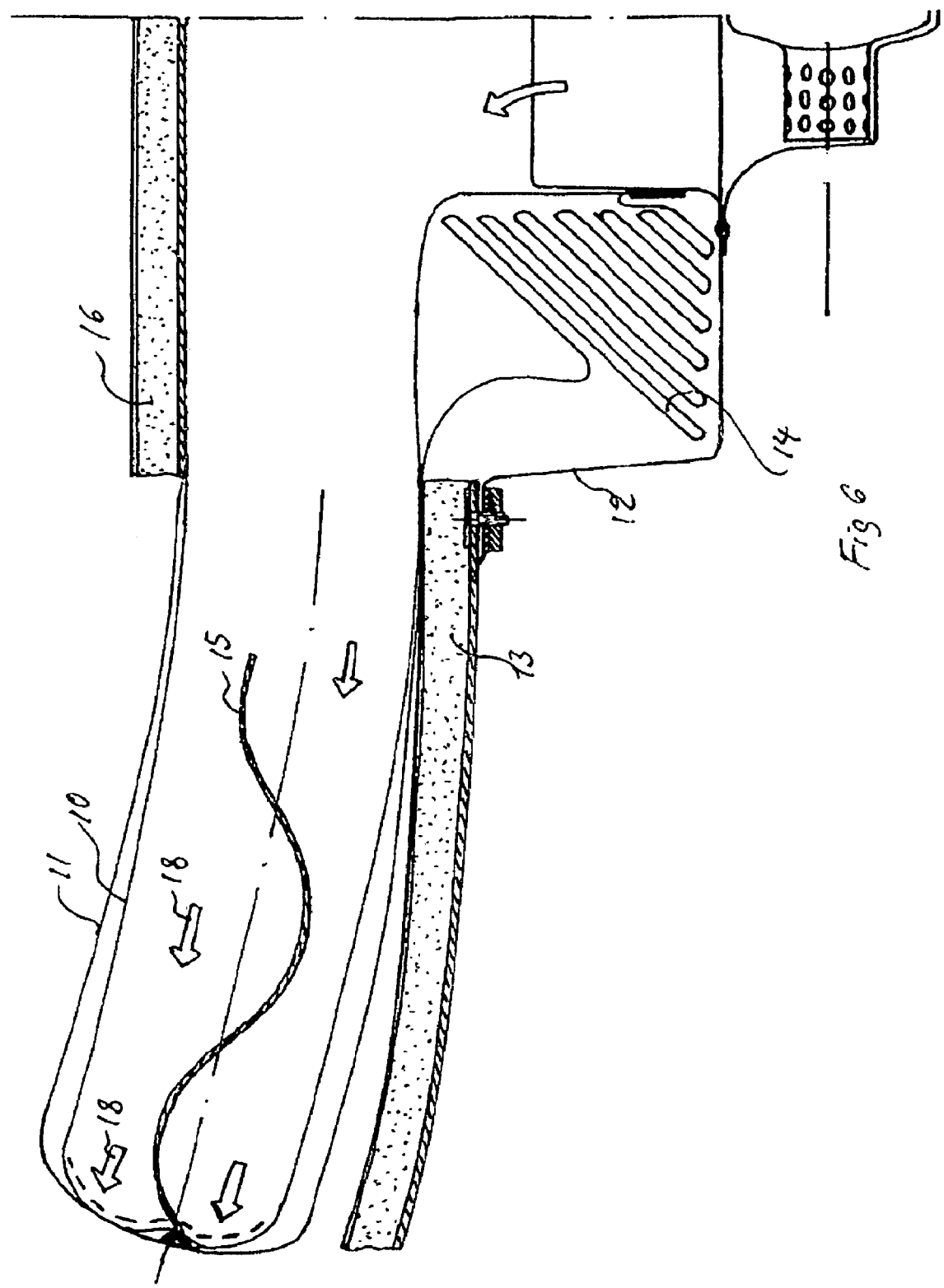
FIG. 6 shows, in a half-section, the end position of an auxiliary bag.

If the pressure 17 rises further, the ropes/threads 1 5 tear and the auxiliary bag 10 "shoots" on both sides and unfolds the airbag 11 "transversely." FIG. 6 shows, in half-section, the end position of the auxiliary airbag 10.

Meanwhile, the air pressure 17 rises further until the auxiliary bag 10, sewn at the end, tears and the gas flow 18 begins to inflate the airbag 11 on both ends in the shape of a bubble as the beginning of the transverse unfolding.

Figure 7:
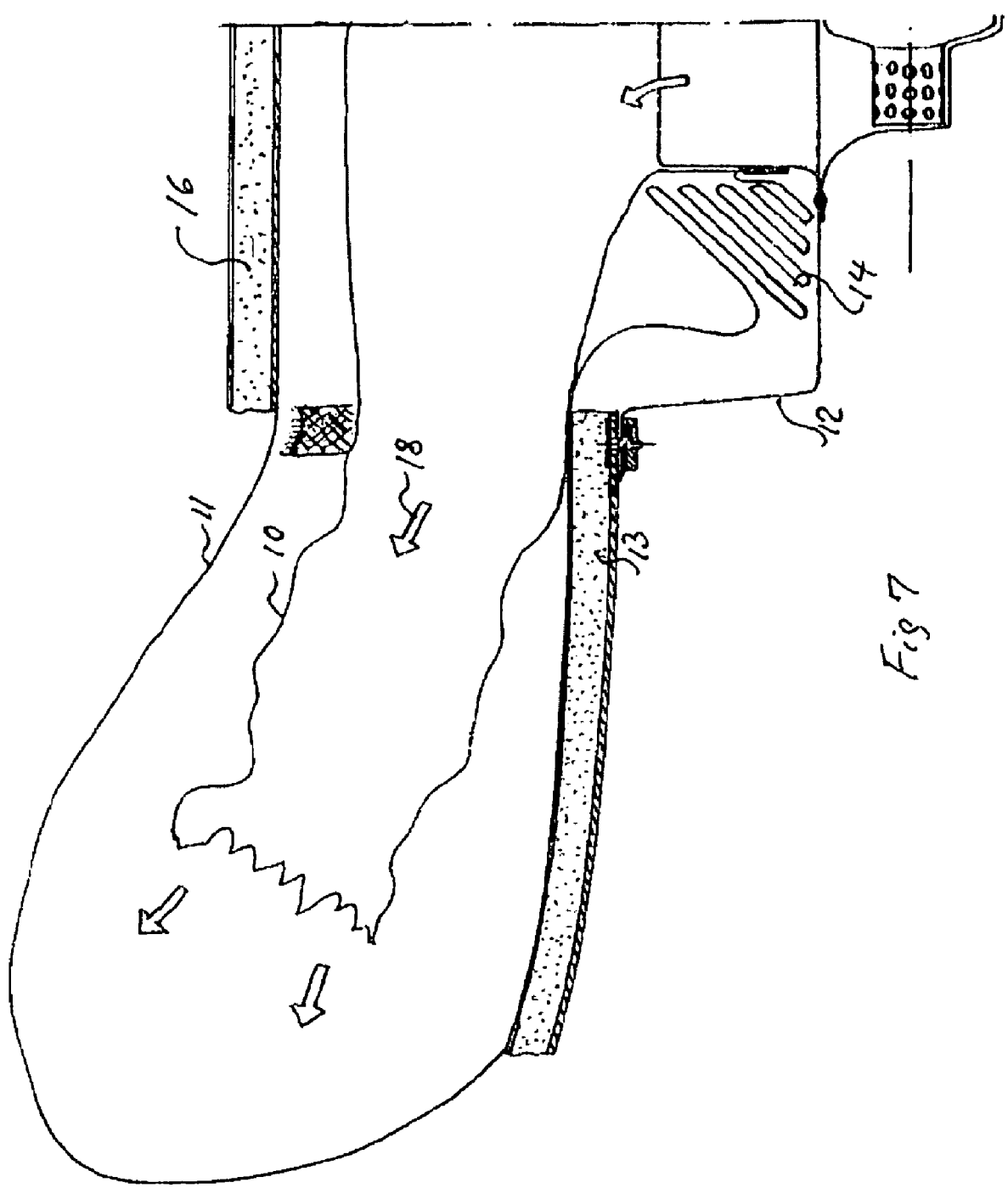
FIG. 7 shows other details of the embodiment in accordance with FIGS. 4-6.
Figure 8:
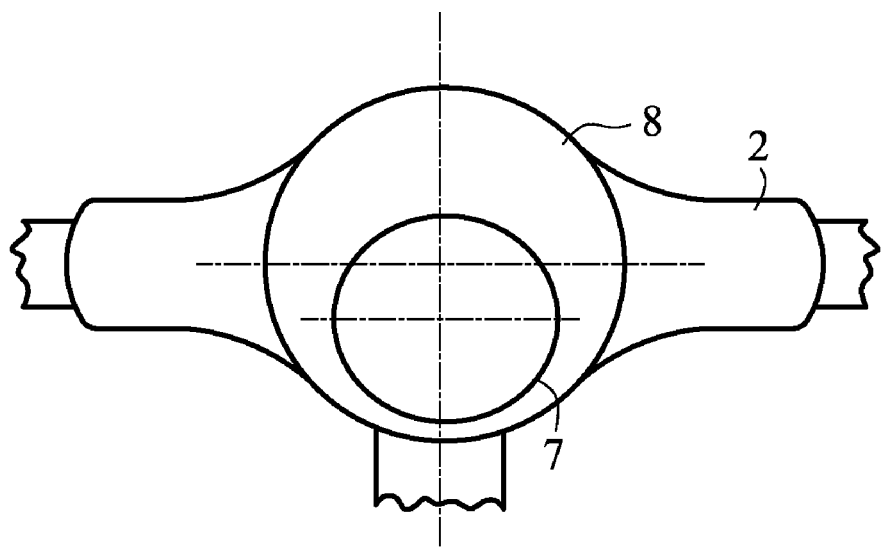
FIG. 8 shows schematically a hose shape for the auxiliary airbag.
Figure 9:
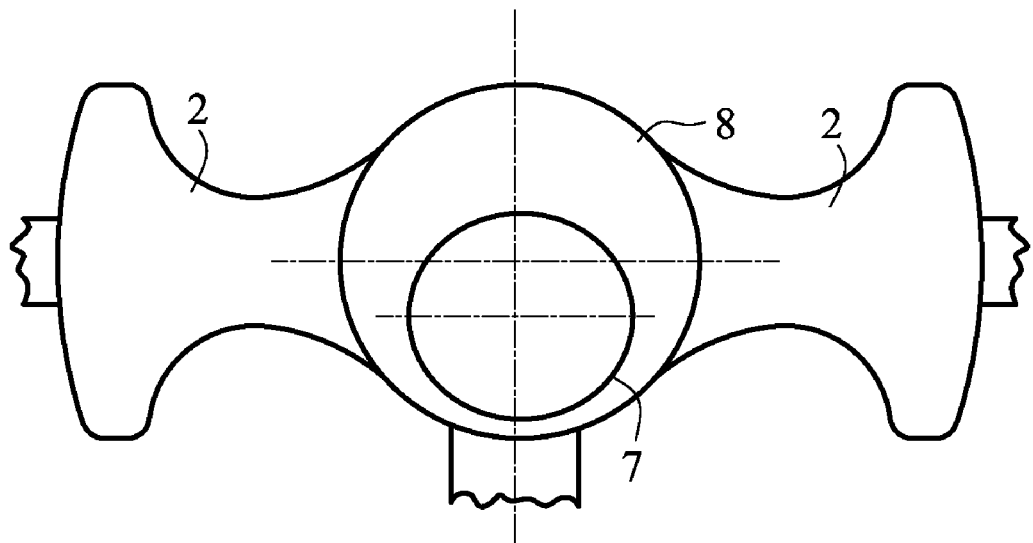
FIG. 9 shows schematically a dog-bone shape for the auxiliary airbag.

For the coordinated unfolding of the airbag 11, tear strips are possibly used, as is shown in FIG. 7.

Thus, the invention, among other things, creates configurations that in essence are based on an airbag system with a nonrotating driver's airbag that also purposefully encloses the occupant laterally and thus covers the A column. Furthermore, as a variant, an airbag system is provided that purposefully covers larger areas with auxiliary airbags and unfolds non-aggressively transverse to the occupant. Applications exist, in particular, for drivers, front-seat passengers, windshields, and roof frames. Another configuration consists in the airbag system being supplied simultaneously from one generator or a small number of generators. The invention under consideration thus also creates, with each of its configurations and any combinations thereof, a purposeful, active, directed unfolding of the airbags and certain technical prerequisites for this, since above all today's front air bag systems are, on the one hand, so aggressive in the immediately surrounding area that occupants are killed, and, on the other, hand only partially cover critical areas. The corresponding preferred and advantageous configurations can thereby be combined with the other configurations but can also be implemented by themselves and are therefore considered as suitable for protection within any of these scopes.

The invention is described, merely by way of example, with the aid of embodiments in the description and in the drawings, and is not restricted to them but rather comprises all variations, modifications, substitutions, and combinations that the specialist can deduce from the documents under consideration, in particular, within the scope of the claims and the general representations in the introduction of this description and the description of the embodiments and their representations in the drawings and can combine with his expert knowledge and the state of the art, in particular including the complete disclosure contents of the older applications indicated at the beginning of this description. In particular, all individual features and configuration possibilities of the invention and their embodiments can be combined.

The invention claimed is:

1. An airbag device comprising:
    an airbag configured to spread initially at least substantially transversely in an ejection direction;
    an auxiliary airbag provided within said airbag for spreading said airbag in the ejection direction,
    said auxiliary bag having an end remote from said airbag, said end opening when a prespecified pressure is exceeded to allow gas to flow into said airbag.

2. The airbag device according to claim 1, wherein said auxiliary bag is spread under pressures reaching 60 bar.

3. The airbag device according to claim 1, wherein the inflated auxiliary airbag has plural extensions with each extension having an end seam that opens when a prespecified pressure is exceeded to allow gas to flow into said airbag.

4. The airbag device according to claim 3, wherein:
    said airbag is designed to be used on a driver's side of a motor vehicle with a steering wheel; and
    said auxiliary bag, in the inflated state, has a size corresponding to the steering wheel.

5. The airbag device according to claim 1, designed to be used on a passenger side of a motor vehicle, wherein the auxiliary bag is hose shaped when inflated, is folded-in before a triggering action, and when triggered, spreads in the ejection direction at least substantially transversely to a travel direction of the motor vehicle.

6. The Airbag device according to claim 5, wherein the auxiliary bag is shaped and designed so that when filled the auxiliary bag has a dog-bone shape.

7. The airbag device according to claim 1, wherein said auxiliary airbag has a preselected configuration to spread initially the airbag in the ejection direction.

8. An airbag device comprising:
    an airbag configured to spread initially at least substantially transversely in an ejection direction;
    an auxiliary airbag having plural extensions mounted within said airbag for spreading said airbag in the ejection direction, said extensions each having an end remote from said airbag with said ends opening when a prespecified pressure is exceeded to allow gas to flow into said airbag.

9. The airbag device according to claim 8, wherein said auxiliary airbag includes a tearable restraining element that initially hinders complete unfolding of the auxiliary airbag in the transverse direction until the airbag has been drawn into a prespecified starting form, whereupon the restraining element is torn and thereafter said ends open when said prespecified pressure is exceeded to allow gas to flow into said airbag.

* * * * *